US 8,594,620 B2

Nov. 26, 2013

(12) United States Patent
Lee

(54) METHOD FOR PERFORMING COMMUNICATION USING COLLECT CALL IN GSM/UMTS-BASED MOBILE COMMUNICATION SYSTEM

(75) Inventor: Se-Hyun Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 11/217,974

(22) Filed: Sep. 1, 2005

(65) Prior Publication Data

US 2006/0121881 A1    Jun. 8, 2006

(30) Foreign Application Priority Data

Dec. 7, 2004  (KR) .................. 10-2004-0102387

(51) Int. Cl.
*H04M 11/00* (2006.01)

(52) U.S. Cl.
USPC ...... 455/406; 455/558; 455/466; 379/114.21; 379/144.02

(58) Field of Classification Search
USPC .............. 379/443, 114.26, 121.05, 433.09, 379/114.2–114.22, 144.02; 455/405–408, 455/558, 466
See application file for complete search history.

(56) References Cited

U.S. PATENT DOCUMENTS

| 5,517,549 | A | * | 5/1996 | Lee | 455/407 |
|---|---|---|---|---|---|
| 5,748,720 | A | * | 5/1998 | Loder | 455/406 |
| 5,774,533 | A | * | 6/1998 | Patel | 379/127.03 |
| 5,937,043 | A | * | 8/1999 | He | 379/114.14 |
| 6,138,006 | A | * | 10/2000 | Foti | 455/414.1 |
| 6,704,563 | B1 | * | 3/2004 | Senn et al. | 455/406 |
| 6,957,059 | B2 | * | 10/2005 | Olah | 455/406 |
| 7,039,388 | B2 | * | 5/2006 | Pienmaki et al. | 455/405 |
| 8,208,895 | B2 | * | 6/2012 | Wieczorek | 455/406 |
| 8,320,539 | B2 | * | 11/2012 | Ingalsbe et al. | 379/114.2 |
| 8,489,068 | B1 | * | 7/2013 | Edwards et al. | 455/406 |
| 2002/0004380 | A1 | * | 1/2002 | Pedersen et al. | 455/406 |
| 2002/0183040 | A1 | * | 12/2002 | Lundstrom et al. | 455/406 |
| 2003/0076940 | A1 | * | 4/2003 | Manto | 379/114.05 |
| 2003/0162526 | A1 | * | 8/2003 | Ogman et al. | 455/406 |
| 2004/0058667 | A1 | * | 3/2004 | Pienmaki et al. | 455/405 |
| 2004/0063432 | A1 | * | 4/2004 | Borsan | 455/445 |
| 2006/0003734 | A1 | * | 1/2006 | Vallinen et al. | 455/406 |

FOREIGN PATENT DOCUMENTS

KR  1020040018721   3/2004
WO  WO 02/25923     3/2002

* cited by examiner

*Primary Examiner* — Sharad Rampuria
(74) *Attorney, Agent, or Firm* — The Farrell Law Firm, P.C.

(57) ABSTRACT

Disclosed is a method for performing communication using a collect call in a GSM/UMTS-based mobile communication system. The method includes the steps of setting by a call originating mobile station a specific field of a call connection request message in such a manner that communication based on the collect call is performed, transmitting the set call connection request message to a call terminating mobile station, and if the call terminating mobile station accepts the collect call, completing call connection establishment with the call terminating mobile station and performing communication based on the collect call.

5 Claims, 5 Drawing Sheets

METHOD FOR PERFORMING COMMUNICATION USING COLLECT CALL IN GSM/UMTS-BASED MOBILE COMMUNICATION SYSTEM

PRIORITY

This application claims priority to an application entitled "Method for Performing Communication Using Collect Call in GSM/UMTS-Based Mobile Communication System" filed in the Korean Intellectual Property Office on Dec. 7, 2004 and assigned Ser. No. 2004-102387, the contents of which are incorporated herein by reference.

BACKGROUND OF THE INVENTION

1. Field of the Invention

The present invention relates to a method for charging a communication fee in a GSM (Global System for Mobile communication)/UMTS (Universal Mobile Telecommunication System) mobile communication system, and more particularly to a method for performing communication using a collect call.

2. Description of the Related Art

Generally, mobile stations in a GSM/UMTS-based mobile communication system include Subscriber Identity Module (SIM) cards or Universal Subscriber Identity Modules (USIM) cards in the inner or outer parts thereof. These SIM/USIM cards including user information, user authentication, and roaming information are essential under the GSM/UTMS environment.

Accordingly, a user may freely use a communication service by obtaining a mobile communication terminal only if the user carries a SIM/USIM card issued by the communication service provider.

The SIM/USIM cards include a function of enabling a prepaid service in which predetermined sums desired by a user are previously charged and used. In other words, through the prepaid SIM card, a user prepays predetermined sums of money for a communication fee and charges the predetermined sums, thereby being able to make calls during a time period corresponding to the charged sums.

FIG. 1 is a flowchart illustrating a typical communication procedure according to a call request of a mobile station.

Referring to FIG. 1, a mobile station 102 transmits a setup message to a GSM/UMTS-based network 104 in order to request a call to a specific mobile station 106 (step 108). The network 104 transmits the setup message to the corresponding mobile station 106 so as to inform the mobile station 106 of the fact that the mobile station 102 has requested a call (step 110). After receiving the setup message, the mobile station 106 transmits to the network 104 a call confirmed message indicating that the mobile station 106 has recognized the request of the call by the mobile station 102 (step 112). The network 104 receives the call confirmed message so as to transmit a "call processing" message to the mobile station 102 (step 114). The mobile station 106 transmits an alerting message to the network 104 so as to report that a call will be connected (step 116). The network 104 delivers the alerting message to the mobile station 102 (step 118).

The call connection is established between the mobile station 102 having requested the call and the mobile station 106 having confirmed the call request (steps 120 and 122), and the mobile station 102 transmits a "connect ack" message to the mobile station 106 (steps 124 and 126), thereby completing the call connection procedure between the mobile stations 102 and 106.

Herein, if there are no sums charged in a prepaid SIM/USIM card of the mobile station 102 requesting a call, the mobile station 102 cannot transmit the setup message to the network 104. In other words, the conventional mobile station 102 cannot originate a call if there are no sums charged in the prepaid SIM/USIM card. In addition, the conventional mobile station 102 cannot even use a short message service (SMS).

SUMMARY OF THE INVENTION

Accordingly, the present invention has been made to solve the above-mentioned problems occurring in the prior art, and an object of the present invention is to provide a method for performing communication using a collect call when all sums charged in an SIM/USIM card are spent in a GSM/UMTS-based communication system.

To accomplish the above objects, there is provided a method for performing communication based on a collect call in a mobile station, the method including the steps of setting by a call originating mobile station a specific field of a call connection request message in such a manner that communication based on the collect call is performed, transmitting the set call connection request message to a call terminating mobile station, and if the call terminating mobile station accepts the collect call, completing call connection establishment with the call terminating mobile station and performing communication based on the collect call.

According to another aspect of the present invention, there is provided a method for performing communication in a call terminating mobile station according to a request for a collect call of a call originating mobile station, the method including the steps of receiving a call connection request message from the call originating mobile station, examining a specific field of the call connection request message and determining if the call connection request is the request for the collect call, determining if the call terminating mobile station accepts the request for the collect call, and if the request for the collect call is accepted, performing communication by paying a communication fee by the call terminating mobile station.

According to still another aspect of the present invention, there is provided a method for performing communication based on a collect call in a mobile communication system, the method including the steps of setting by a call originating mobile station a specific field of a call connection request message in such a manner that communication based on a collect call is performed and transmitting by the call originating mobile station the set call connection request message to a call terminating mobile station, receiving by the call terminating mobile station the call connection request message from the call originating mobile station and determining by the call terminating mobile station if the specific field of the call connection request message is set in such a manner that communication based on the collect call is performed, and if the call terminating mobile station accepts the request for the collect call, establishing the call connection between the call originating mobile station and the call terminating mobile station and performing the collect call.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
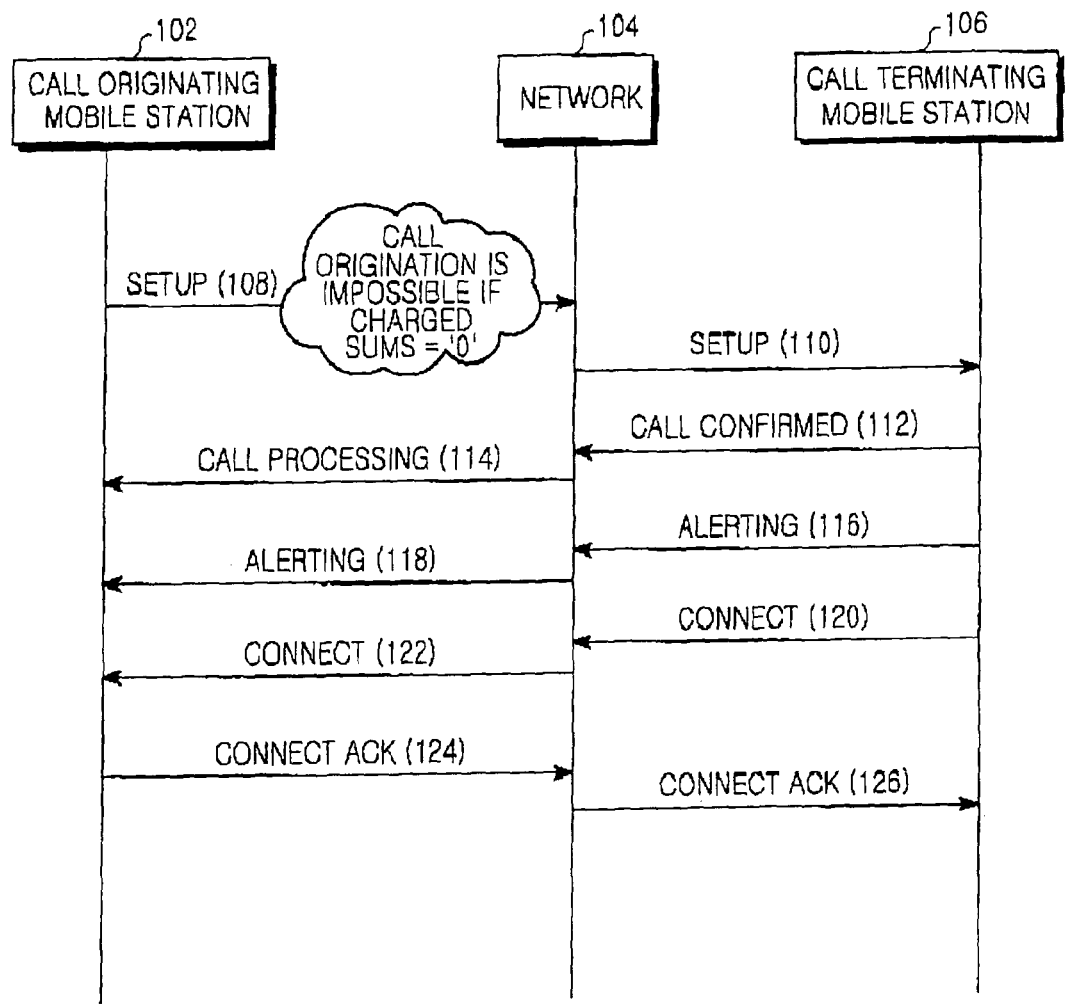
FIG. 1 is a flow diagram illustrating a typical communication procedure according to a call request of a mobile station.

Hereinafter, preferred embodiments of the present invention will be described in detail with reference to the accompanying drawings. The same or similar components in the drawings are designated by the same reference numerals as far as possible although they are shown in different drawings. In the following description of the present invention, a detailed description of known functions and configurations incorporated herein will be omitted when it may make the subject matter of the present invention unclear.

The present invention proposes a communication method for charging a communication fee to a receiver terminal by using a Subscriber Identity Module (SIM) card or a Universal Subscriber Identity Module (USIM) card in a communication system employing the Global System for Mobile communication (GSM)/Universal Mobile Telecommunication System (UMTS).

In more detail, the present invention proposes a method in which, when user equipment (UE) including a prepaid SIM/USIM card (which is previously charged with predetermined sums and can be used for communication by the charged sums) spend all of the charged sums, a receiver terminal pays a communication fee, thereby enabling a service of originating a call in an emergency. The present invention is adaptable for all communication systems employing prepaid SIM/USIM cards. In the following description, the GSM/UMTS communication system will be described as a representative communication system employing the SIM/USIM card. In addition, SIM card will be described as an example of the SIM/USIM card because SIM card has the same function as a USIM card.

Figure 2:
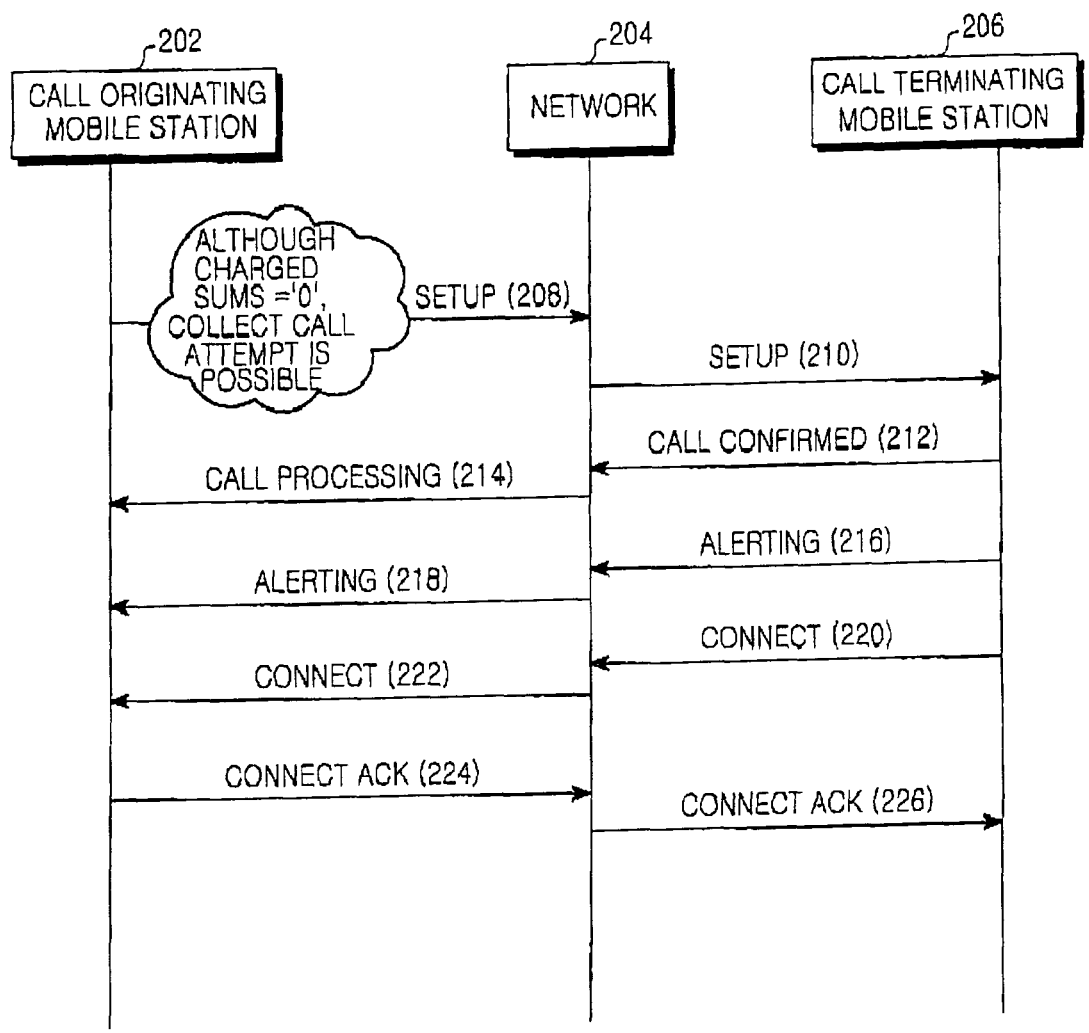
FIG. 2 is a flow diagram illustrating a communication procedure depending on a call request of a mobile station according to an embodiment of the present invention.

FIG. 2 illustrates a communication procedure depending on a call request of a mobile station according to one embodiment of the present invention.

Referring to FIG. 2, a mobile station 202 transmits a setup message to a GSM/UMTS-based network 204 in order to request a call to a specific mobile station 206 (step 208). The network 204 transmits the setup message to the corresponding mobile station 206 so as to inform the mobile station 206 of the fact that the mobile station 202 has requested a call (step 210). Herein, in order to realize a communication method for charging a communication fee to a receiver terminal according to an embodiment of the present invention, several specific fields of the setup message are somewhat modified. The setup message according to present invention is shown in Table 1.

TABLE 1

| IE | Information element | Type/Reference | Presence | Format | Length |
|---|---|---|---|---|---|
| | Call control protocol discriminator | Protocol discriminator 10.2 | M | V | ½ |
| | Transaction identifier | Transaction identifier 10.3.2 | M | V | ½ |
| | Setup Message Type | Message Type 10.4 | M | V | 1 |
| D- | BC repeat indicator | Repeat indicator 10.5.4.22 | C | TV | 1 |
| 04 | Bearer capability 1 | Bearer capability 10.5.4.5 | O | TLV | 3.16 |
| 04 | Bearer capability 2 | Bearer capability 10.5.4.5 | O | TLV | 3.16 |
| 1C | Facility | Facility 10.5.4.15 | O | TLV | 2–? |
| 1E | Progress | Progress Indicator 10.5.4.21 | O | TLV | 4 |
| 34 | Signal | Signal 10.5.4.23 | O | TLV | 2 |
| 5C | Calling party BCD Number | Calling party BCD Num. 10.5.4.9 | O | TLV | 3.14 |
| 5D | Calling party sub-address | Calling party sub-address 10.5.4.10 | O | TLV | 2.23 |
| 5E | Called party CD number | Called part BCD num. 10.5.4.7 | O | TLV | 3.19 |
| 6D | Called party Sub-Address | Called party subaddr. 10.5.4.8 | O | TLV | 2.23 |
| 74 | Redirecting party BCD number | Redirecting party BCD number 10.5.4.21a | O | TLV | 3.19 |
| 75 | Redirecting party sub-address | Redirecting party sub-address 10.5.4.21b | O | TLV | 2.23 |
| D- | LLC repeat indicator | Repeat indicator 10.5.4.22 | O | TV | 1 |
| 7C | Low Layer compatibility I | Low layer comp. 10.5.4.18 | O | TLV | 2.18 |
| 7C | Low Layer compatibility II | Low layer comp. 10.5.4.18 | C | TLV | 2.18 |
| D- | HLC repeat indicator | Repeat Indicator 10.5.4.22 | O | TV | 1 |
| 7D | High layer Compatibility I | High layer Comp. 10.5.4.16 | O | TLV | 2.5 |
| 7D | High layer Compatibility II | High layer Comp. 10.5.4.16 | C | TLV | 2.5 |
| 7E | User-user | User-user 10.5.4.25 | O | TLV | 3.35 |
| 8- | Priority | Priority Level 10.5.1.11 | O | TLV | 1 |
| 19 | Alert | Alerting Pattern 10.5.4.26 | O | TLV | 3 |
| 2F | Network Call Control Capabilities | Network Call Control cap. 10.5.4.29 | O | TLV | 3 |
| 3A | Cause of No CLI | Cause of No CLI 10.5.4.30 | O | TLV | 3 |

Table 1 shows the setup message according to the present invention, and the Calling party Binary Coded Decimal (BCD) number field of the setup message in Table 1 is modified. Table 2 shows the Calling party BCD number field in detail.

TABLE 2

| 8 | 7 | 6 | 5 | 4 | 3 | 2 | 1 | |
|---|---|---|---|---|---|---|---|---|
| | | Calling party BCD number IEI | | | | | | Octet1 |
| | Length of calling party BCD number contents | | | | | | | Octet2 |
| 0/1 ext | Type of number | | | Numbering plan identification | | | | Octet3 |
| 1 ext | Presentat.indicator | | 0 spare | 0 | 0 | screening indicator | | Octet3a* |
| | Number digit 2 | | | | Number digit 1 | | | Octet 4* |
| | Number digit 4 | | | | Number digit 3 | | | Octet 5* |

In the present invention, when a mobile station requests a collect call, a value of the spare field in the Calling party BCD number field is modified, thereby enabling the collect call. Herein, the spare field is not used in the current GSM/UMTS standard and has a null value. Accordingly, although the value of a flag requesting the collect call is input, additional problems do not occur. The flag value is determined in the realization of a system, and the description about the determination of the flag value will be omitted in the present invention. Although the spare field has [0, 0, 0] as an initial value in Table 2, when the mobile station requests a collect call according to the present invention, the mobile station may record another value (e.g., [1, 1, 1]) in the spare field so as to inform a receiver terminal of the fact that a collect call is requested.

In the meantime, description about steps 212 to 226 in FIG. 2 will be omitted because steps 212 to 226 in FIG. 2 follow the same procedures as step 112 to 126 in FIG. 1.

Hereinafter, a call connection procedure in a call originating mobile station according to an embodiment of the present invention will be described with reference to FIG. 3.

Figure 3:
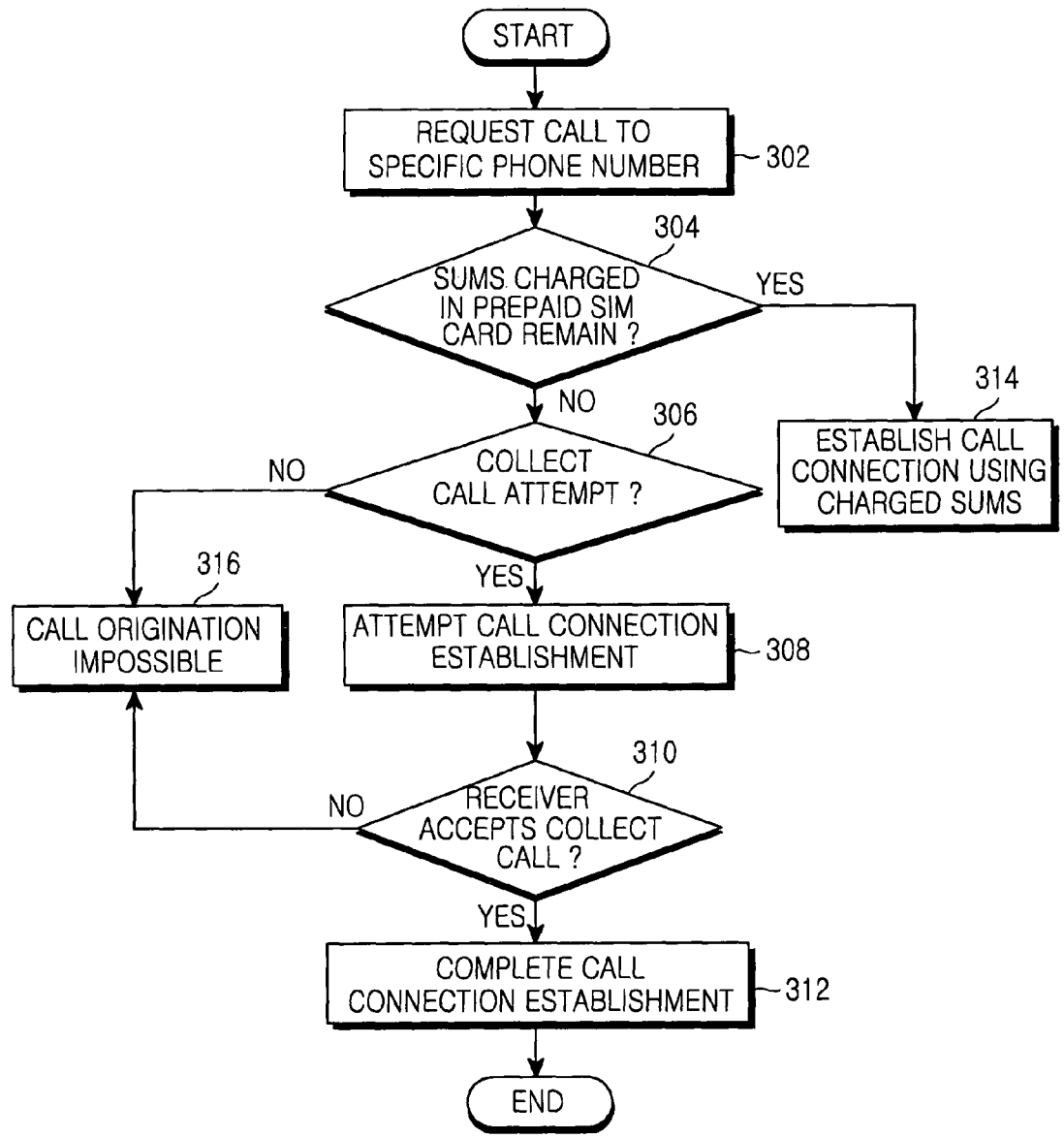
FIG. 3 is a flowchart illustrating a call connection procedure of a mobile station originating a call according to an embodiment of the present invention.

Referring to FIG. 3, in step 302, the call originating mobile station requests call connection to a specific phone number (i.e., a call terminating mobile station). In step 304, the call originating mobile station determines if sums previously charged in a prepaid SIM card remain. If the previously-charged sums remain as the determination result, step 314 is performed. If all charged sums are spent, step 306 is performed.

In step 314, the call originating mobile station establishes call connection with the call terminating mobile station by spending the charged sums. In step 306, the call originating mobile station determines whether to perform the collect call because the call originating mobile station has spent all of the charged sums. If the call originating mobile station attempts the collect call, step 308 is performed. If the call originating mobile station does not attempt the collect call, step 316 is performed.

In step 316, the call originating mobile station cannot originate a call in the same manner as the conventional technique. In step 308, the call originating mobile station modifies the value of the spare field of the Calling party BCD Number field in the setup message according to the present invention so as to attempt to establish the call connection according to a collect call with the call terminating mobile station and performs step 310.

If the call terminating mobile station accepts the collect call in step 310, step 312 is performed. If the call terminating mobile station rejects the collect call in step 310, step 316 is performed. In step 312, the call originating mobile station completes the establishment of the call connection with the call terminating mobile station, and communication is performed under the payment of a communication fee by the call terminating mobile station.

Figure 4:
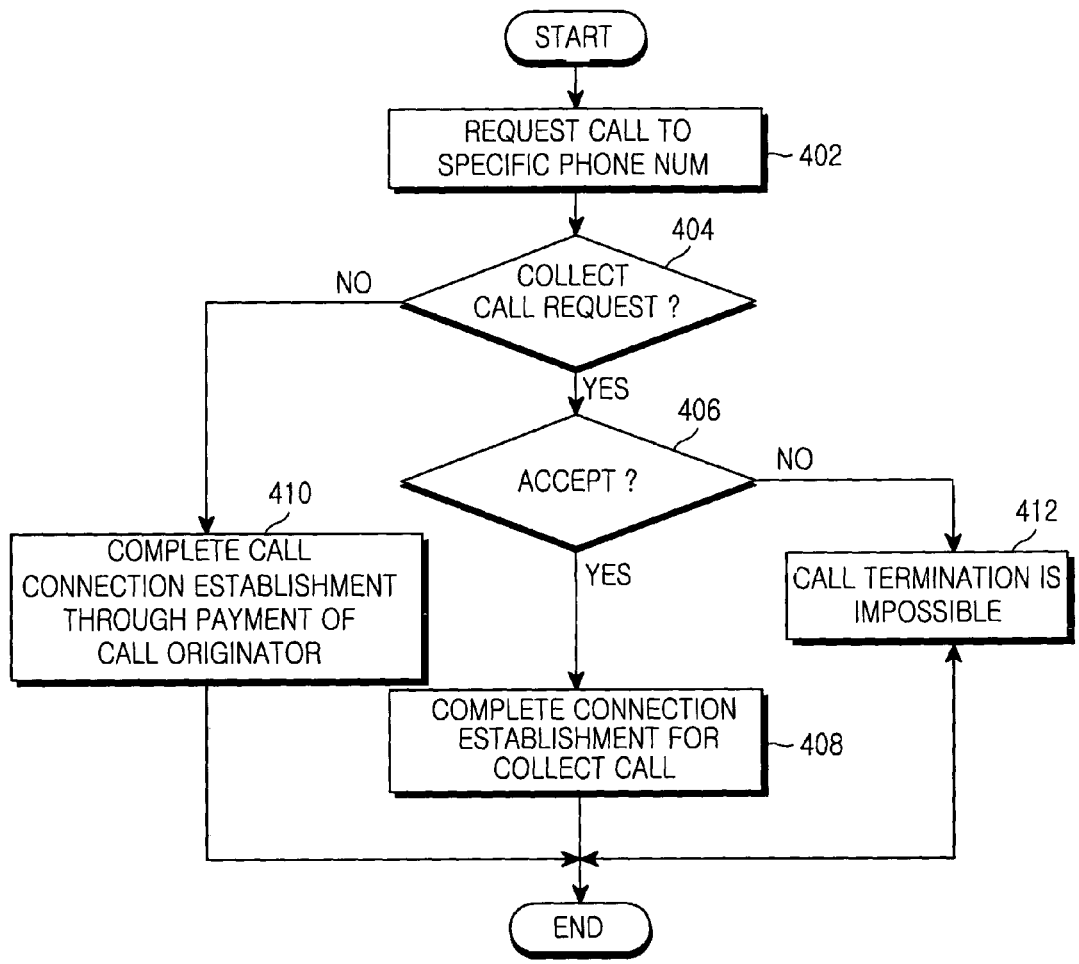
FIG. 4 is a flowchart illustrating a call connection procedure in a mobile station terminating a call according to an embodiment of the present invention.

FIG. 4 is a flowchart illustrating the call connection procedure in the call terminating mobile station according to an embodiment of the present invention.

Referring to FIG. 4, in step 402, the call terminating mobile station recognizes the call connection request from the call originating mobile station. In step 404, the call terminating mobile station reads out the value of the spare field of the Calling party BCD Number field in the setup message so as to determine if the call connection request is a request for a collect call. If the spare field has a value used for indicating the request for the collect call as a result of the determination, step 406 is performed. If the spare field has a value used for indicating the payment of a communication fee by the call originating mobile station, step 410 is performed.

In step 410, the call terminating mobile station completes the call connection establishment and performs communication under the payment of the communication fee by the call originating mobile station. In step 406, the call terminating mobile station determines whether to accept the collect call. If the call terminating mobile station accepts the collect call as a result of the determination, step 408 is performed. If the call terminating mobile station rejects the collect call as a result of the determination, step 412 is performed.

In step 412, the call connection is not achieved between the call originating mobile station and the call terminating mobile station because the call terminating mobile station rejects the call connection for the collect call. In step 408, the call terminating mobile station can perform communication through the call connection establishment with the call originating mobile station under the payment of a communication fee by the call terminating mobile station.

In the above description, only a call connection between the call originating mobile station and the call terminating mobile station is described, and applications such as short message service (SMS) are not mentioned. However, the present invention is adaptable for applications such as the SMS as well as call connection for the collect call. For example, when the SMS is used, a service fee for the SMS may be paid. If the prepaid SIM card has no sums to be spent, the call terminating mobile station may be asked about whether to receive the SMS through a collect call as described above. After it is determined that the SMS will be accepted by the collect call, a short message of the SMS may be read.

Figure 5:
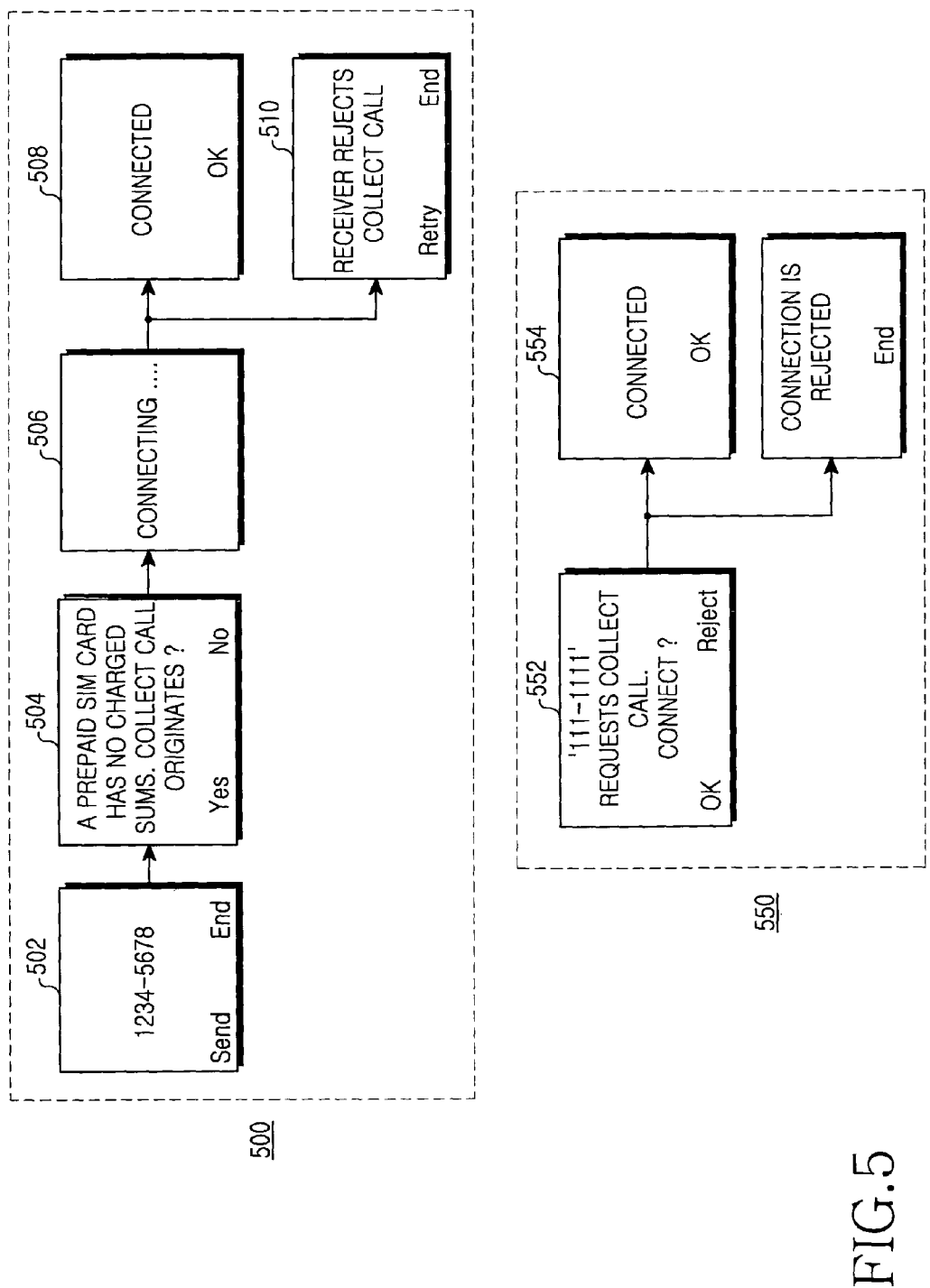
FIG. 5 illustrates display windows of a mobile station originating a call and a mobile station terminating a call according to an embodiment of the present invention.

FIG. 5 illustrates display windows of a call terminating mobile station 550 and a call originating mobile station 500 according to an embodiment of the present invention.

Referring to FIG. 5, the call originating mobile station 500 having a phone number of "111-1111" requests call connection to the call terminating mobile station having a phone number of "1234-5678" (step 502). If a prepaid SIM card has no charged sums remaining, a display window of the call originating mobile station 500 displays an image shown in step 504. In other words, the display window displays the fact that it is difficult to originate a call because the prepaid SIM card has no charged sums remaining. In addition, the display window displays a query about whether a user wishes to originate a call using a collect call instead of using the prepaid SIM card. An image shown in step 506 shows a "connecting" state when the call originating mobile station establishes call connection for a collect call.

Herein, the display window of the call terminating mobile station 550 displays a message through an image shown in step 552. In other words, the display window displays a message reporting that a connection request for a collect call is received from a user using a phone number of "111-1111". In addition, the display window displays a query about whether a user using the call terminating mobile station 550 will accept the connection request for the collect call. If the user accepts the connection request for the collect call, the window of the call terminating mobile station 550 displays an image shown in step 554, and the window of the call originating mobile station 500 displays an image shown in step 508. Therefore, the users recognize the fact that the call connection establishment is achieved. However, if the user using the call terminating mobile station 550 rejects the connection request for the collect call, the window of the call terminating mobile station displays an image shown in step 556, and the window of the call originating mobile station displays an image shown in step 510. Herein, the image shown in step 510 shows a message informing the user using the call originating mobile station of the fact that the connection request for the collect call is rejected by the user using the call terminating mobile station.

In another embodiment of the present invention, although charged sums remain, the call originating mobile station can attempt communication using a collect call whenever every call connection is requested according to a preset call establishment scheme. That is, the call originating mobile station may be set to perform communication using a collect call for a receiver terminal appointed in advance, so that pre-charged sums can be used for an urgent call connection request.

As described above, according to the present invention, although a mobile station including a prepaid SIM card in a GSM/UMTS-based mobile communication system spends all sums charged in the prepaid SIM card, the mobile station can make a communication connection or transmit an SMS using a collect call. Therefore, the mobile station can originate a call using a collect call in an emergency. Accordingly, communication providers can obtain higher profits also.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for performing communication based on a collect call in a mobile station, the method comprising the steps of:
    determining, by a call originating mobile station having a prepaid Subscriber Identity Module (SIM) card charged with predetermined sums, whether the predetermined sums in the SIM card remain, when a user requests a call connection to a call terminating mobile station;
    when there are no sums charged in the prepaid SIM card, automatically attempting, by the call originating mobile station, communication based on the collect call, by:
        setting, by the call originating mobile station, a specific field of a call connection request message to permit a short message based on the collect call to be transmitted; and
        transmitting the set call connection request message to the call terminating mobile station;
    when the call terminating mobile station accepts the transmission of the short message based on the collect call, performing communication based on the collect call by transmitting the short message to the call terminating mobile station; and
    when there are sums charged in the prepaid SIM card, automatically attempting, by the call originating mobile station, communication not based on the collect call, using the sums.

2. The method as claimed in claim 1, wherein, in the step of setting the specific field of the call connection request message, the specific field is set to have a flag value indicating the collect call.

3. A method for performing communication based on a collect call in a mobile communication system, the method comprising the steps of:
    determining, by a call originating mobile station having a prepaid Subscriber Identity Module (SIM) card charged with predetermined sums, whether the predetermined sums in the SIM card remain, when a user requests a call connection to a call terminating mobile station;
    when there are no sums charged in the prepaid SIM card, automatically attempting, by the call originating mobile station, communication based on the collect call, by setting, by the call originating mobile station, a specific field of a call connection request message to permit a short message based on the collect call to be transmitted and transmitting, by the call originating mobile station, the set call connection request message to the call terminating mobile station;
    receiving, by the call terminating mobile station, the call connection request message from the call originating mobile station and determining, by the call terminating mobile station, whether or not to permit communication based on the collect call to be performed;
    when the call terminating mobile station accepts the request for the transmission of the short message based on the collect call, performing the collect call by transmitting the short message to the call terminating mobile station; and
    when there are sums charged in the prepaid SIM card, automatically attempting, by the call originating mobile station, communication not based on the collect call, using the sums.

4. The method as claimed in claim 3, wherein the setting of the specific field of the call connection request message is achieved by setting a value of a flag of the specific field so as to indicate the communication based on the collect call.

5. The method as claimed in claim 3, wherein, when the call terminating mobile station rejects the request for the collect call, the call terminating mobile station does not establish the call connection with the call originating mobile station.

* * * * *